United States Patent
Liu et al.

(10) Patent No.: US 8,416,990 B2
(45) Date of Patent: Apr. 9, 2013

(54) HIERARCHICAL VIDEO SUB-VOLUME SEARCH

(75) Inventors: Zicheng Liu, Bellevue, WA (US); Norberto Adrian Goussies, Buenos Aires (AR)

(73) Assignee: Microsoft Corporation, Redmond, WA (US)

( * ) Notice: Subject to any disclaimer, the term of this patent is extended or adjusted under 35 U.S.C. 154(b) by 420 days.

(21) Appl. No.: 12/858,301

(22) Filed: Aug. 17, 2010

(65) Prior Publication Data

US 2012/0045092 A1 Feb. 23, 2012

(51) Int. Cl.
*G06K 9/00* (2006.01)
(52) U.S. Cl.
USPC .......................... 382/103; 382/173; 382/181
(58) Field of Classification Search .................. 382/103, 382/173, 181
See application file for complete search history.

(56) References Cited

U.S. PATENT DOCUMENTS

| | | | |
|---|---|---|---|
| 5,532,814 A | 7/1996 | Cha | |
| 5,969,661 A | 10/1999 | Benjamin | |
| 6,411,339 B1 * | 6/2002 | Akutsu et al. | 348/584 |
| 6,449,312 B1 * | 9/2002 | Zhang et al. | 375/240.16 |
| 2002/0069218 A1 * | 6/2002 | Sull et al. | 707/501.1 |
| 2004/0190775 A1 | 9/2004 | Miller | |
| 2004/0220965 A1 * | 11/2004 | Harville et al. | 707/104.1 |

OTHER PUBLICATIONS

Improving the Quality of Multi-resolution Volume Rendering—Published Date: 2006 http://www.cs.sfu.ca/~torsten/Publications/Papers/ev06-1.pdf.
Exploiting Multi-level Parallelism for Low-latency—Published Date: Feb. 22, 2010 http://www.cs.cmu.edu/~mychen/publication/ChenMMSYS10.pdf.
Human Action Detection by Boosting Efficient Motion Features—Published Date: 2009 http://vipbase.net/homepage/iccv09_voec_action.pdf.
Event Detection in Crowded Videos—Published Date: 2007 http://www.cs.cmu.edu/~yke/video/iccv2007.pdf.
Speeding up Spatio-Temporal Sliding-Window Search for Efficient Event Detection in Crowded Videos~Published Date: 2009 http://research.microsoft.com/en-us/um/people/zliu/papers/eimm32444-yuan.pdf.
Generic Human Action Recognition from a Single Example—Published Date: 2009 http://users.soe.ucsc.edu/~rokaf/paper/IJCV_ActionRecognition_Final_Mar27.pdf.

* cited by examiner

*Primary Examiner* — Tom Y Lu
(74) *Attorney, Agent, or Firm* — Gonzalez Saggio & Harlan LLP (57) ABSTRACT

Described is a technology by which video, which may be relatively high-resolution video, is efficiently processed to determine whether the video contains a specified action. The video corresponds to a spatial-temporal volume. The volume is searched with a top-k search that finds a plurality of the most likely sub-volumes simultaneously in a single search round. The score volumes of larger spatial resolution videos may be down-sampled into lower-resolution score volumes prior to searching.

20 Claims, 4 Drawing Sheets

HIERARCHICAL VIDEO SUB-VOLUME SEARCH

BACKGROUND

It is relatively easy for the human brain to recognize and/or detect certain actions such human activities within live or recorded video. For example, in a surveillance application, it is easy for a viewer to determine whether there are people in a given scene and reasonably judge where there are any unusual activities. In home monitoring applications, video can be used to track a person's daily activities, e.g., for tele-monitoring of medical patients or the elderly.

It is often not practical to have a human view the large amounts of live and/or recorded video that are captured in many of the scenarios where video is used. Thus, automated processes are sometimes used to automatically distinguish and detect certain actions from others. However, automatically detecting such actions within video is difficult and overwhelming for contemporary computer systems, in part because of the vast amounts of data that need to be processed for even a small amount of video.

Recently developed feature point-based action recognition techniques have proven to be more effective than traditional tracking-based techniques, but they are still computationally expensive due to the task of processing the large number of feature points. As a result, applications requiring fast processing, such as real-time or near real-time surveillance or monitoring, have not been practical.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which video is efficiently processed to determine whether the video contains a specified action (or other specified class). The video, which is a set of frames over time and thus corresponds to a three-dimensional (3D) volume is searched to find one or more sub-volume therein that likely contains the action class.

In one aspect, high-resolution video is processed into a score volume containing data (scores) indicative of how likely each part of a frame contains the action (based upon previous feature point detection). The score volume is down-sampled into a lower-resolution score volume.

In one aspect, a top-k search is performed, e.g., on the lower-resolution score volume, to detect a plurality of class instances corresponding to a plurality of the sub-volumes that most-likely match the action class in a single search.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards more efficiently detecting actions within video using automated processes. To this end, a hierarchical sub-volume search technique is described that significantly accelerates the search for actions in video (which is the most expensive part of feature-point based action detection) relative to existing techniques. More particularly, a hierarchical sub-volume search algorithm performs down-sampling to reduce the spatial resolution of a score volume, wherein the score volume in general contains scores that represent the likelihood of an action being within a given video frame. The algorithm also may use a k-best 3D maximum-sum technique to further speed up the search, that is, via a top-k volume search that enables the generally simultaneous detection of multiple action instances. Because of the acceleration (on the order of forty times faster than existing techniques without adversely affecting the detection quality/accuracy), contemporary computer systems are able to detect human actions in real time, even for relatively high-resolution videos (e.g. 320 by 240 or higher).

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in video processing in general.

Figure 1:
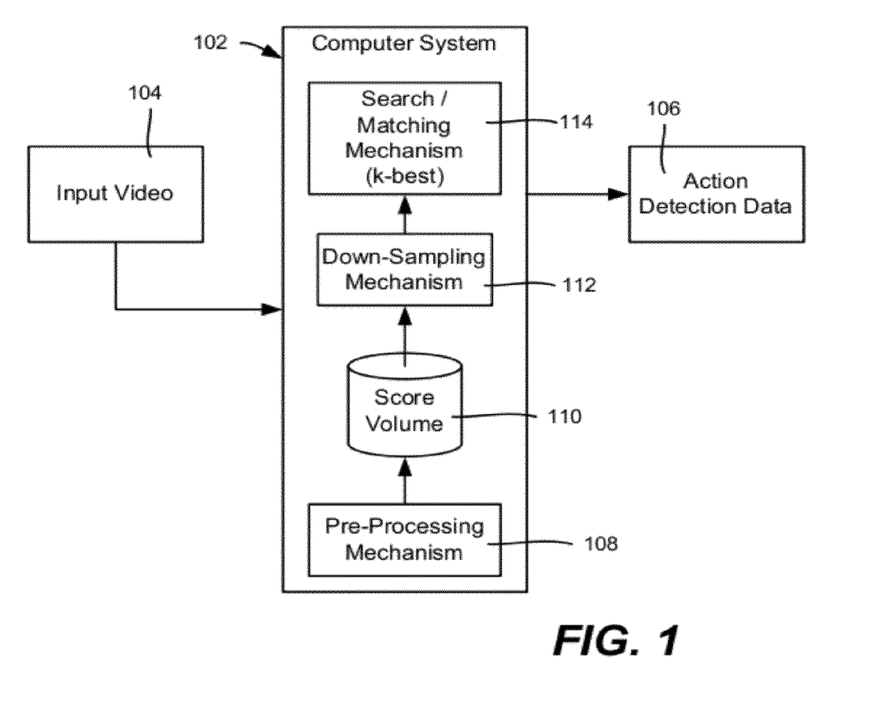
FIG. 1 is a block diagram representing example components for detecting actions in videos.

FIG. 1 shows a block diagram in which a computer system 102 processes a set of input video 104, e.g., which may be real time video or a previously recorded clip. In general, the processing determines whether the video 104 may be classified as having a particular action therein, as represented in FIG. 1 by the action detection data 106 (e.g., such as a yes/no classification). As will be understood, when detected, the action may be identified with respect to space and time, e.g., a "yes" classification may include information as to when (at what time) and where (in which sequential frames or sub-frames) the particular action took place, referred to as a sub-volume.

In general, a pre-processing mechanism 108 performs interest point detection, descriptor extraction, and score computation from the original video sequence in a known manner, such as described in U.S. patent application Ser. No. 12/814, 507, hereby incorporated by reference. This provides a score volume 110, which may be down-sampled and searched as described below and as represented in FIG. 1 via blocks 112 and 114. The result is the action detection data 106, such as data in the form of a list of the time and frame locations (one or more sub-volumes) that contain the action being detected.

Figure 2:
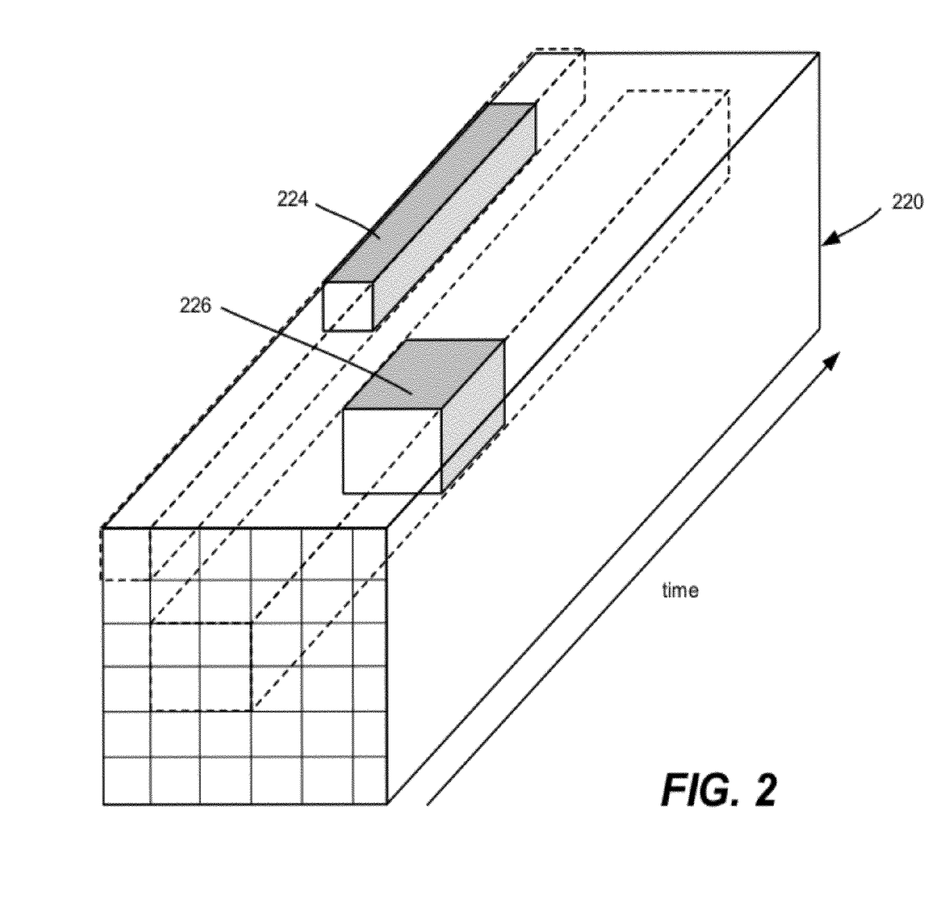
FIG. 2 is representation of sub-volumes within a volume corresponding to video data.
Figure 3:
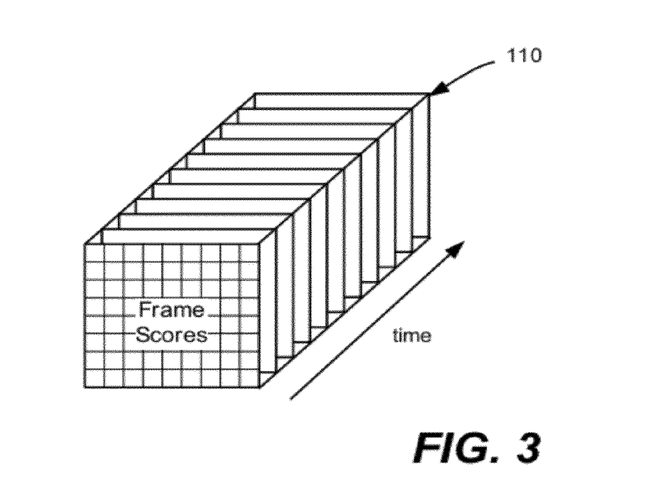
FIG. 3 is representation of a score volume formed via score data of a series of two-dimensional images taken over time

FIGS. 2 and 3 show the concept of a volume 220 and a score volume 110, respectively, for video data. The technology described herein is directed towards efficiently finding the sub-volume (or sub-volumes) within the volume 220 of input video 104 that most closely matches a specified action class. In general, the frames are two-dimensional images, which over time can be considered a three-dimensional volume, e.g., any pixel may be identified by a two-dimensional spatial position coordinates and a temporal coordinate. Because not all of the images contain the action being detected, and even for a given image that contains the action not all of the area within that image contains the action, a general aspect of action detection is to detect which area or areas and which frames (times) contain the desired action (most closely match a specified action class). In the example of FIG. 2, these areas and times correspond to the sub-volumes 222 and 224. The technology described herein is directed towards efficiently finding such relevant sub-volumes; when found, a video can be classified by that sub-volume.

As represented in FIG. 3, a frame of video may be first processed into feature point scores that in general correspond to the likelihood of a grid section of the frame containing the action. For example, a video sequence may be represented by a collection of spatio-temporal invariant points (STIPs), where each STIP casts a positive or negative-valued vote for the action class, based on its mutual information with respect to the action class.

In order to detect a desired action occurring within a sub-volume, a search is performed on the frames. However, searching for actions in video space is far more complex than searching for objects in an image space. More particularly, without knowing the location, temporal duration, and the spatial scale of the action, the search space for video actions is prohibitive for performing an exhaustive search. For example, a one-minute video sequence of size 160×120× 1800 may contain more than 1,000 three-dimensional sub-volumes of various sizes and locations. Higher-resolution videos are even more expensive to search.

Figure 4:
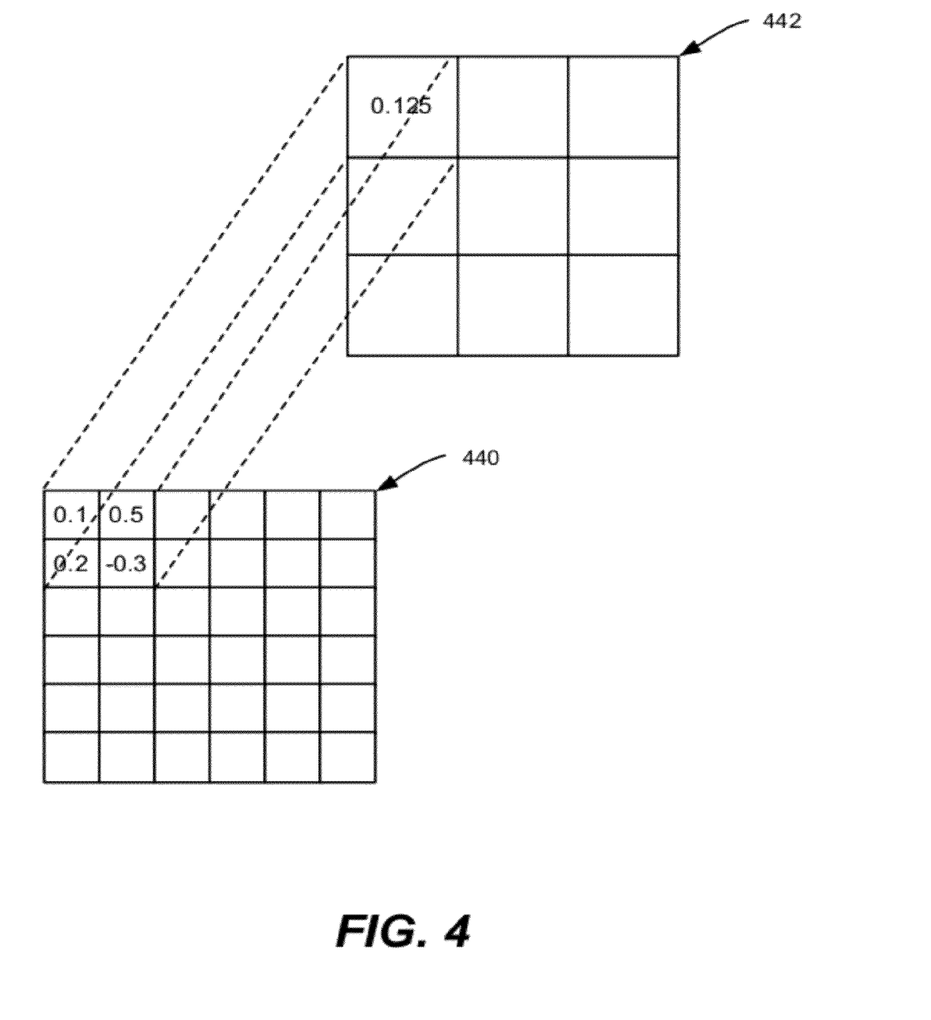
FIG. 4 is a representation of down-sampling scores of a score volume into reduced resolution data.

As described herein, one way to reduce the spatial resolution to search is down-sampling. As represented in FIG. 4, down-sampling, such as by averaging or otherwise mathematically combining some number of frame scores (e.g., separated into grids within each frame) may be used to further reduce the spatial resolution. While down-sampling a four-by-four grid of a frame score 440 into a single grid in the spatially-reduced frame 442 is exemplified in FIG. 4, other down-sampling ratios may be used.

As described herein, one technique spatially down-samples the video space by a factor s before performing the search. More particularly, for a video volume V of size m×n×t, the size of the down-sampled volume $V^s$ with scale factor s is $$\frac{m}{s} \times \frac{n}{s} \times t.$$

For any point $(i, j, k) \in V^s$ where i∈

$$i \in \left[0, \frac{m}{s} - 1\right],$$

$$j \in \left[0, \frac{n}{s} - 1\right]$$

and k∈[0, t−1], its score is defined as the sum of the scores of the s×s points in V, that is, $f^s(i,j,k)^s$ is defined as:

$$f^s(i, j, k) = \sum_{x=0}^{s-1} \sum_{y=0}^{s-1} f(s*i+x, s*j+y, k). \quad (1)$$

Given any sub-volume $V^s$=[L, R]×[T, B]×[B, E] ⊂ $V^s$, ξ·$V^s$ denotes its corresponding sub-volume in V, that is, $$\xi(V^s)=[s*L,s*(R+1)-1]\times[s*T,s*(B+1)-1]\times[B,E]. \quad (2)$$

It is seen that:

$$f^s(V^s)=f(\xi(V^s)). \quad (3)$$

Therefore $$\max_{V^s \subset V^s} f^s(V^s) \leq \max_{V \subset V} f(V). \quad (4)$$

A sub-volume $V=[X_1, X_2]\times[Y_1, Y_2]\times[T_1, T_2]$ is called an s-aligned sub-volume if $X_1$ and $Y_1$ are multiples of s and the width $X_2-X_1+1$ and height $Y_2-Y_1+1$ are also multiples of s. Equation (2) provides a one-to-one mapping between the volumes in $V^s$ and the s-aligned sub-volumes in V. Let V* denote an optimal sub-volume in V, that is, $f(f(V^*)=\max_{V \subset V}f$ (V). Assume $V^*=[x_1,x_1+w-1]\times[y_1,y_1+h-1]\times[t_1,t_2]$ where w and h are the width and height of V*, respectively. Let |V| denote the number of pixels in V. It can be shown that there exists an s-aligned sub-volume $\tilde{V}=[\tilde{x}_1,\tilde{x}_1+\tilde{w}-1]\times[\tilde{y}_1,\tilde{y}_1+\tilde{h}-1]\times[t_1,t_2]$ such that:

$$|(V^*\backslash \vec{V})\cup(\vec{V}\backslash V^*)|\leq s*h+s*w+s^2)(t_2-t_1). \quad (5)$$

Therefore:

$$\frac{|(V^*\backslash \tilde{V})\cup(\tilde{V}\backslash V^*)|}{|V^*|} \leq \frac{s*h+s*w+s^2}{wh}. \quad (6)$$

If the total score of a sub-volume is assumed to be in average proportional to its size, then $$\frac{f(|(V^*\backslash \tilde{V})\cup(\tilde{V}\backslash V^*)|)}{f(V^*)} \leq \frac{s*h+s*w+s^2}{wh}. \quad (7)$$

Therefore:

$$\frac{f(V^*)-f(\tilde{V})}{f(V^*)} \leq \frac{s*h+s*w+s^2}{wh}. \quad (8)$$

Let $V^*$=argmax$_{\tilde{V}\in V^s f(V)}$ denote the optimal sub-volume in $V^s$. Equation (8) yields:

$$\frac{f(V^*)-f^s(\tilde{V}^*)}{f(V^*)} \leq \frac{s*h+s*w+s^2}{wh}. \quad (9)$$

Note that the left hand side of Equation (9) is the relative error of the optimal solution in the scaled video volume $V^s$. By way of example, suppose a spatial dimension of V is 320×240, and the scale factor s=8. The spatial dimension of the down-sampled volume is 40×30. Assuming that the window size of the optimal sub-volume V* is 64×64, then the average relative error is $$\frac{s*h + s*w + s^2}{wh} = \frac{8*64 + 8*64 + 8^2}{64^2} \approx 25\%. \quad (10)$$

After down-sampling, known heuristics to speed up the branch-and-bound search do not give good results, generally because down-sampling smoothes the scores, and results in many more sub-volumes with scores above the selection threshold. Conversely, without the heuristic, the exact search algorithm is relatively slow, even for the down-sampled 40×30 volumes. To address this problem, there is described a multi-instance sub-volume search.

The multi-instance search algorithm described in U.S. patent application Ser. No. 12/814,507 repeatedly applies a single-instance algorithm many times until some stop criteria is met, e.g., after k iterations where k is a user-specified integer, and/or when the detection score is smaller than a user-specified detection threshold.

Described herein is an algorithm that is more efficient than applying the single-instance algorithm k times. To this end, different variants corresponding to the above two stop criteria are described. One variant, referred to herein as λ search, may be applied when finding the sub-volumes above a user-specified threshold λ:

```
 1: Initialize P as empty priority queue
 2: set 𝕎 = [T, B, L, R] = [0, m] × [0, m] × [0, n] × [0, n]
 3: push( 𝕎 ,F̂( 𝕎 )) into P
 4: repeat
 5:    Initialize current best solution F*, W*
 6:    repeat
 7:       retrieve top state 𝕎 from P based on F̂( 𝕎 )
 8:       if F̂( 𝕎 ) > λ then
 9:          split 𝕎 into 𝕎¹ ∪ 𝕎²
10:          if F̂( 𝕎¹) > λ then
11:             push ( 𝕎¹,F̂( 𝕎¹)) into P
12:             update current best solution {W*, F*}
13:          end if
14:          if F̂( 𝕎²) > λ then
15:             push ( 𝕎² ,F̂( 𝕎²)) into P
16:             update current best solution {W*, F*}
17:          end if
18:       end if
19:    until F̂( 𝕎 ) ≤ F*
20:    T* = argmax$_{T \in [0,t]}$f(W*, T);
21:    add V* = [W*, T*] to the list of detected subvolumes.
22:    for each point (i, j, k) ∈ V*, set f(i, j, k) = 0.
23: until F̂( 𝕎 ) ≤ λ
```

Following the notation in U.S. patent application Ser. No. 12/814,507, 𝕎 denotes a collection of spatial windows, where 𝕎 is defined by four intervals which specify the parameter ranges for the left, right, top, and bottom positions, respectively. Given any set of windows 𝕎 , F( 𝕎 ) denotes its upper bound which is estimated as described in U.S. patent application Ser. No. 12/814,507. $W_{max}$ denotes the largest window among the windows in 𝕎 . Initially, 𝕎 is equal to the set of the possible windows on the image. In terms of worst case complexity, the number of branches of this algorithm is no larger than $O(n^2m^2)$ because the algorithm does not restart the priority queue P. Each time it branches, the algorithm has to compute the upper bound which has complexity $O(t)$. Therefore the worst complexity involved in branch and bound is $O(tn^2 m^2)$. In addition, each time when the algorithm detects a sub-volume, the algorithm has to update the scores of the video volume, which has complexity $O(nmt)$. If there are k detected sub-volumes, the complexity for updating the scores is $O(kmnt)$. Overall, the worst case complexity of this algorithm is $O(n^2 m^2 t) + O(kmnt)$.

Another variant described herein, referred to as top-k search, may be applied when finding the top-k sub-volumes:

```
 1: Initialize P as empty priority queue
 2: set 𝕎 = [T, B, L, R] = [0, m] × [0, m] × [0, n] × [0, n]
 3: push( 𝕎, F̂( 𝕎 )) into P
 4: c=1
 5: repeat
 6:    Initialize ({W$_i$*, F$_i$*})$_{i=c...k}$ where F$_k$* ≤ ... ≤ F$_c$*
 7:    repeat
 8:       retrieve top state 𝕎 from P based on F̂( 𝕎 )
 9:       if F̂( 𝕎 ) > F$_k$* then
10:          split 𝕎 into 𝕎¹ ∪ 𝕎²
11:          if F̂( 𝕎¹) > F$_k$* then
12:             push ( 𝕎¹, F̂( 𝕎¹)) into P
13:             update ({W$_i$*, F$_i$*})$_{i=1...k}$
14:          end if
15:          if F̂( 𝕎²) > F$_k$* then
16:             push ( 𝕎², F̂( 𝕎²)) into P
17:             update ({W$_i$*, F$_i$*})$_{i=1...k}$
18:          end if
19:       end if
20:    until F̂( 𝕎 ) ≤ F$_l$*
21:    T* = argmax$_{T \in [0,t]}$f(W*, T);
22:    output V$_c$* = [W*, T*] as the c-th detected subvolume
23:    for each point (i, j, k) ∈ V$_c$*, set f(i, j, k) = 0.
24:    c = c+1
25: until c > k
```

As can be seen, unlike previous branch-and-bound search techniques which restart a new search for each action instance, the top-k sub-volumes are found with a single search round. The top-k algorithm finds all the sub-volumes with scores larger than a user-specified threshold. Note that the algorithm is similar to the λ search algorithm, with some differences. As one difference, instead of maintaining a single current best solution, top-k algorithm maintains k-best current solutions. Further, the top-k algorithm replaces the criteria F̂( 𝕎 )>λ with F̂( 𝕎 )>F$_k$* to determine where to insert 𝕎¹ or 𝕎² into the queue P.

Another difference is that the top-k algorithm replaces the inner-loop stop criteria F̂( 𝕎 )≤F*λ with F̂( 𝕎 )≤F$_c$*. Further, the outer-loop stop criteria F̂( 𝕎 )≤λ is replaced with c>k. In the top-k algorithm, the number of outer loops is k, whereby the worst case complexity is also $O(n^2m^2t)+O(kmnt)$.

As can be seen, to handle larger video resolutions/screen sizes, the technology described herein down-samples the video frames for a more efficient upper-bound estimation. Further, the technology improves on the existing branch-and-bound searching to directly perform a (top-k) volume search from video data, which enables the detection of multiple action instances essentially simultaneously. The result is action detection that is efficient for multi-instance action detection, achieving real-time or near real time detection with frame sizes such as 320×240, while being robust to scale changes, subject changes, background clutter, speed variations, and even partial occlusions. Note that the top-k volume search algorithm is general and can be applied to other types of pattern search problems in videos.

Exemplary Operating Environment

Figure 5:
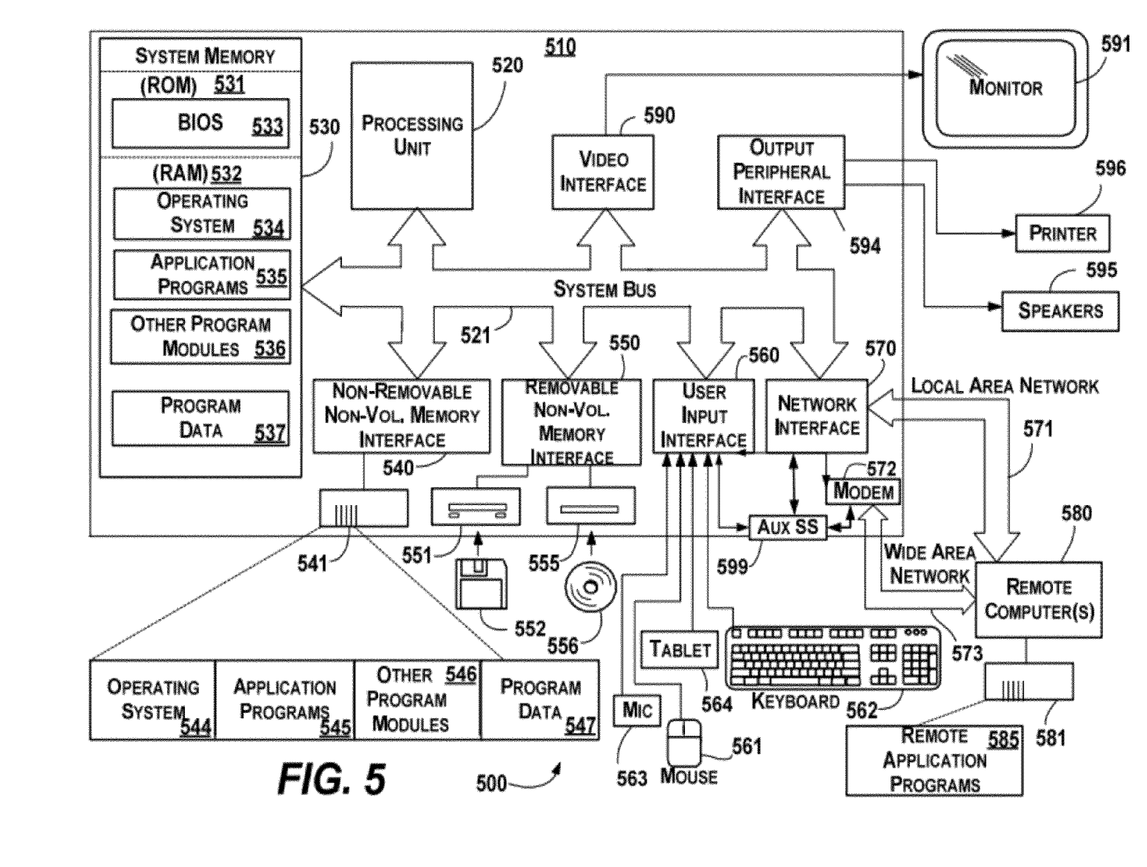
FIG. 5 shows an illustrative example of a computing environment into which various aspects of the present invention may be incorporated.

FIG. 5 illustrates an example of a suitable computing and networking environment 500 into which the examples and implementations of any of FIGS. 1-4 may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by, a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with, a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interlace or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component 574 such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising, processing a volume corresponding to video, including down-sampling a score volume having data representative of a class in the video into down-sampled data, and searching for the class by using the down-sampled data to find one or more sub-volumes that match at least a desired score with respect to the class.

2. The method of claim 1 wherein the class corresponds to an action class, and wherein processing the volume detects an action within the video.

3. The method of claim 1 wherein searching comprises performing top-K searching to detect a plurality of class instances corresponding to the sub-volumes in a single search.

4. The method of claim 1 wherein searching comprises performing lambda searching.

5. The method of claim 1 wherein down-sampling the score volume comprises mathematically combining a plurality of scores corresponding to grids of a frame into a single score in the down-sampled data.

6. The method of claim 5 wherein mathematically combining the plurality of scores comprises summing up the scores.

7. The method of claim 1 further comprising, processing the volume into feature points, and processing the feature points into the score volume.

8. In a computing environment, a system comprising, a down-sampling mechanism that processes a score volume corresponding to scores of feature points representing actions in a video volume into reduced-resolution score data, and a search mechanism that searches the reduced-resolution score data to determine whether input video corresponding to the volume contains an action matching a specified action class, the search mechanism processing sub-volumes within the volume to determine one or more sub-volumes most likely to contain the action.

9. The system of claim 8 wherein the score volume corresponds to frames of scores separated by a grid into a plurality of areas, each area associated with a score, and wherein the down-sampling mechanism processes the score volume by mathematically combining the scores of a plurality of areas into a single score.

10. The system of claim 8 wherein the score volume corresponds to frames of scores separated by a grid into a plurality of areas, each area associated with a score, and wherein the down-sampling mechanism processes the score volume by summing up the scores of a plurality of areas.

11. The system of claim 8 further comprising a pre-processing mechanism that computes feature points and associates each feature point with likelihood data indicative of whether that feature point is more likely or less likely to correspond to the action, and wherein the score volume is based upon processing the likelihood data into scores.

12. The system of claim 8 wherein the search mechanism determines a plurality of sub-volumes having a highest likelihood of containing the action in a single search.

13. The system of claim 8 wherein the search mechanism determines at least one sub-volume based upon a comparison with a threshold likelihood value.

14. The system of claim 8 wherein the search mechanism determines a highest likelihood sub-volume based upon a lambda search.

15. The system of claim 8 wherein the down-sampling mechanism reduces the resolution by a constant scale factor.

16. The system of claim 8 wherein the down-sampling mechanism reduces the resolution from video data corresponding to 320 by 240 resolution to 40 by 30 resolution.

17. In a computing environment, a method comprising, processing data corresponding to video, including performing top-k searching for a class to find, in a single search, one or more sub-volumes corresponding to scores in a score volume that match at least a desired score with respect to the class.

18. The method of claim 17 wherein the class corresponds to an action class, and wherein processing the volume detects an action within the video.

19. The method of claim 17 wherein the top-k searching is performed on the data in a reduced-resolution score volume, and further comprising, down-sampling a score volume corresponding to the video into the reduced-resolution score volume.

20. The method of claim 17 further comprising, processing the video into feature points, and processing the feature points into the score volume.

\* \* \* \* \*